United States Patent [19]

Wittmar et al.

[11] Patent Number: 5,000,429
[45] Date of Patent: Mar. 19, 1991

[54] BODY-SIDE MOUNTING FOR A SUSPENSION STRUT OR SPRING SHOCK ABSORBER OF A MOTOR VEHICLE

[75] Inventors: Siegfried Wittmar, Walldorf; Ulrich Griesheimer, Darmstadt, both of Fed. Rep. of Germany

[73] Assignee: General Motors Corporation, Detroit, Mich.

[21] Appl. No.: 396,478

[22] Filed: Aug. 21, 1989

[30] Foreign Application Priority Data

Aug. 30, 1988 [DE] Fed. Rep. of Germany ....... 3829376

[51] Int. Cl.$^5$ ............................. F16F 9/54; F16F 1/38
[52] U.S. Cl. ................................... 267/220; 267/292; 267/153; 267/141.3
[58] Field of Search ................. 280/668; 267/220, 153, 267/33, 292, 293, 294, 141.1, 141.2, 141.3

[56] References Cited

U.S. PATENT DOCUMENTS

| 2,272,900 | 2/1942 | Saurer ................................. 267/293 |
| 3,975,007 | 8/1976 | Chorkey .............................. 267/292 |
| 4,319,768 | 3/1982 | Youngdale ......................... 280/668 |
| 4,618,130 | 10/1986 | Veglia ................................. 267/153 |
| 4,673,192 | 6/1987 | Krehan et al. ..................... 280/668 |
| 4,810,003 | 3/1989 | Pinch et al. ....................... 280/668 |

FOREIGN PATENT DOCUMENTS

| 3041985C2 | 1/1983 | Fed. Rep. of Germany . |
| 3532681A1 | 3/1987 | Fed. Rep. of Germany . |
| 1341188 | 9/1963 | France ................................. 267/220 |
| 622374 | 6/1961 | Italy ..................................... 267/292 |
| 1220934 | 3/1986 | U.S.S.R. ............................. 267/153 |
| 851152 | 10/1960 | United Kingdom ............. 267/292 |
| 2026131 | 1/1980 | United Kingdom ............. 267/33 |

OTHER PUBLICATIONS

German ("GM") Document Numbered 1,960,990 Prepared by Ford-Werke Aktiengesellschaft, Mar. 1967.

Primary Examiner—Charles A. Marmor
Assistant Examiner—Karin Tyson
Attorney, Agent, or Firm—A. Michael Tucker

[57] ABSTRACT

The invention pertains to a body-side mounting for suspension strut (1, 2, 3) or spring shock absorber of a motor vehicle, with a rubber mount (8) effective between the body and suspension strut, predominantly loaded in shear, which is placed between a mount receptacle (7) formed into the body or parts thereof and a spacer (6) joined to the suspension strut, with the mount receptacle and spacer being adjusted to the dimensions of the rubber mount and receiving the latter in the inward spring deflection direction and radially thereto.

The object of the present invention is to create a body-side mounting of the aforesaid type in which the rubber mount itself, when radial forces are introduced, for example, as a result of full steering lock, guarantees a largely constant spring rate and therefore stable steering response.

The object is achieved by the fact that teeth are provided on the inside of the mount receptacle (region 22) and on the outside of the spacer (region 15), which engage in teeth in the rubber mount (regions 16, 19). The teeth prevent the rubber mount, when radial forces are introduced, from shifting from its loaded side to the unloaded side, which would lead to a degressive change in spring stiffness.

8 Claims, 3 Drawing Sheets

BODY-SIDE MOUNTING FOR A SUSPENSION STRUT OR SPRING SHOCK ABSORBER OF A MOTOR VEHICLE

BACKGROUND OF THE INVENTION

The invention pertains to a body-side mounting for a suspension strut or spring shock absorber of a motor vehicle, with a rubber mount effective between the body and suspension strut, predominantly loaded in shear, which is placed between a mount receptacle formed into the body or parts thereof and a spacer joined to the suspension strut, with the mount receptacle and spacer being adjusted to the dimensions of the rubber mount and receiving the latter in the inward spring deflection direction and radially thereto.

A body-side mounting of this kind, in which, however, the mount located between the mount receptacle and spacer is configured as a rubber-metal mount, is known, for example, from DE-PS No. 30 41 985. The rubber-metal mount consists of a cylindrical inner sheet-metal casing, joined with the shock absorber piston rod or the housing of the suspension strut, possibly with a roller bearing or plain bearing interposed, a rotationally symmetrical and conically shaped outer sheet-metal casing joined to the body and an annular rubber element adhesively vulcanized between the inner and outer sheet-metal casings, predominantly loaded in shear. The outer sheet-metal casing is inserted from below into the mount receptacle matched to its dimensions and is received therein in a form-fitting manner in the spring deflection direction and perpendicularly thereto, while the outer sheet-metal casing is held in the mount receptacle in the outward spring deflection by frictional engagement alone.

The known mounting has proved entirely successful in practice, but has the critical disadvantage that the rubber-metal mount can only be produced with a large outlay in terms of manufacturing and cost. For example, the mount requires both an inner sheet-metal casing and an outer sheet-metal casing, which are to be adjusted to the mounting elements on the body side and on the suspension strut or spring shock absorber side; moreover, the rubber element shaped to correspond to the contour of the inner and outer sheet-metal casings must be adhesively vulcanized to these parts.

DE-GM No. 1,960,990 discloses a body-side mounting for a suspension strut or spring damper of a motor vehicle, in which a simple annular rubber mount is received between a rotationally symmetrical body-side mount receptacle and a spacer, also shaped with rotational symmetry, joined to the suspension strut. Although the rubber mount represents a considerable simplification in design over a rubber-metal mount and thus can also be produced more economically, it displays decisive disadvantages under a load in the radial direction, for example, when the steering is at full lock. For example, a radial load on the rubber mount causes the rubber to shift from the loaded side to the unloaded side, which is accompanied by creep behavior and a degressive spring stiffness, resulting in unstable steering response. Besides this, the creep behavior of the rubber ring results in increased wear on the rubber mount.

To improve the damping properties of the body-side mounting of the suspension strut or spring shock absorber, DE-GM No. 1,960,990 furthermore recommends that the rubber mount be provided, at its contact surface with the body-side mount receptacle, with indentations that gradually come into contact with the mount support as the compression load increases. As a result, the spring constant decreases as the compression load increases, and the transition from a low spring constant with shear load to a higher spring constant with compression load is smoothed out, except, however, that creep behavior by the rubber mount under shear load cannot be prevented.

The object of the present invention is to create a body-side mounting of the aforesaid type in which the rubber mount itself, when radial forces are introduced as a result of full steering lock, guarantees a largely constant spring rate and therefore stable steering response.

The object is achieved by the fact that teeth are provided on the inside of the mount receptacle and on the outside of the spacer, which engage in teeth in the rubber mount.

The configuration of the body-side mounting according to the invention in the region of the mount receptacle, the rubber mount and the spacer causes creep behavior of the rubber to be prevented under all driving conditions of the motor vehicle. For example, when there is a radial load on the rubber mount, because of its form-fitting joints with the mount receptacle and the spacer, the rubber does not shift from the loaded to the unloaded side of the rubber mount; it is thus held in position and guarantees stable steering response along with progressive spring stiffness.

The configuration of the body-side mounting according to the invention in the region of the aforesaid components makes it possible, with reference to the rubber mount, to eliminate the rubber-metal joint, so that the mount can be produced much more economically and there is also a reduction in scrap as compared to a rubber-metal joint. Moreover, the simple configuration of the rubber mount and of the mount receptacle and spacer allows a reduction in costs for production of the parts and thus a decrease in product cost.

Especially good mounting properties, particularly with regard to steering response, can be achieved with the body-side mounting when the motor vehicle has a top-mounted steering system and therefore, because of the overhead attachment point, when greater radial forces can be introduced into the rubber mount. Even in the case of a bottom-mounted mounting, with consequently lower radial forces, the body-side mounting according to the invention is regarded as conditionally necessary.

One especially simple design configuration of the body-side mounting provides for the mount receptacle and spacer to be configured as stamped sheet-metal parts and for the teeth of these parts to be present as depressions and projections in the particular stamped sheet-metal part. They should advantageously extend regularly over the inner circumference of the mount receptacle and the outer circumference of the spacer, respectively, and preferably be located in the regions with which the rubber mount comes into contact when radial forces are introduced.

Additional features of the invention are presented in the description of the figures; note that all individual features and all combinations of individual features are essential to the invention.

BRIEF DESCRIPTION OF THE DRAWINGS

The invention is illustrated in the figures with reference to one embodiment, without being confined to this embodiment, in which.

DETAILED DESCRIPTION OF A PREFERRED EMBODIMENT

Figure 1:
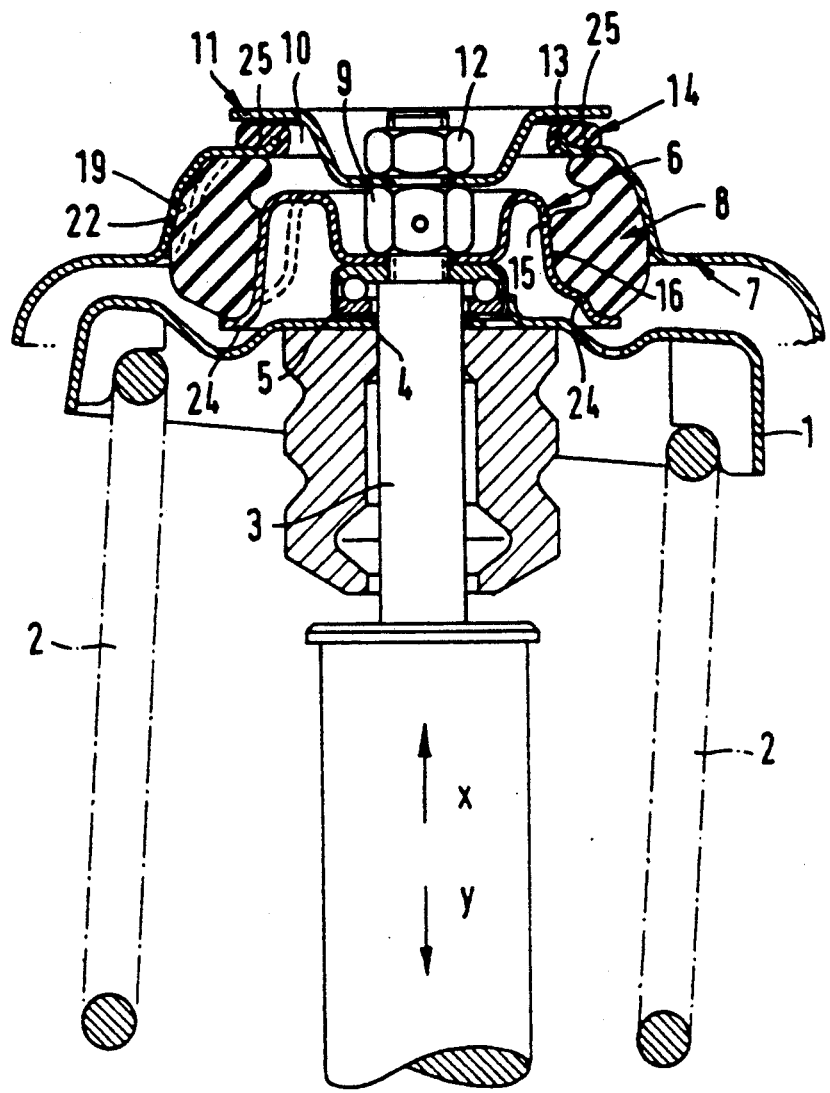
FIG. 1 shows a longitudinal section of the body-side mounting for a suspension strut of a motor vehicle according to the invention.
Figure 2A:
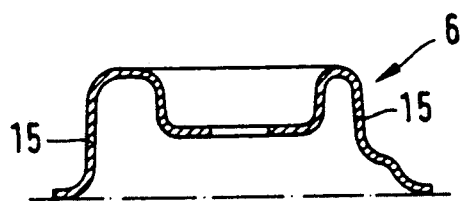
FIG. 2A shows a section through the spacer along line A—A in FIG. 2.
Figure 3A:
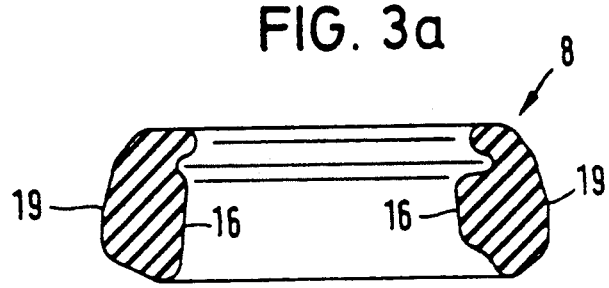
FIG. 3A shows a section through the rubber mount along line B—B in FIG. 3.
Figure 2:
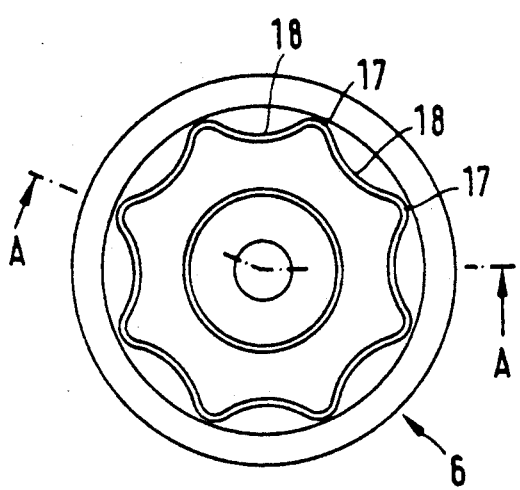
FIG. 2 shows a top view of the spacer.
Figure 3:
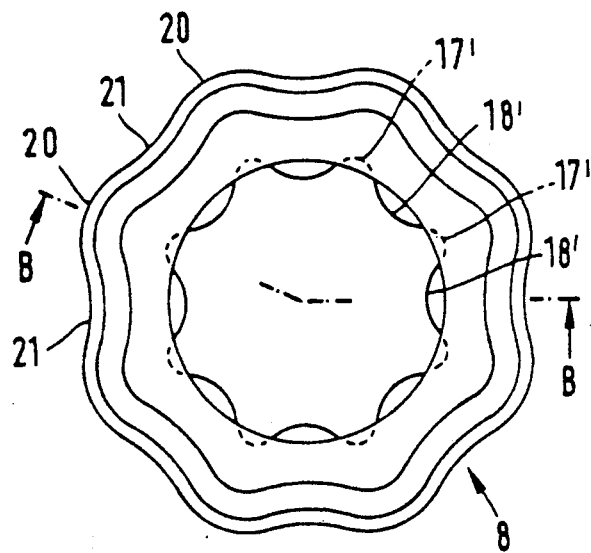
FIG. 3 shows a top view of the rubber mount.
Figure 4A:
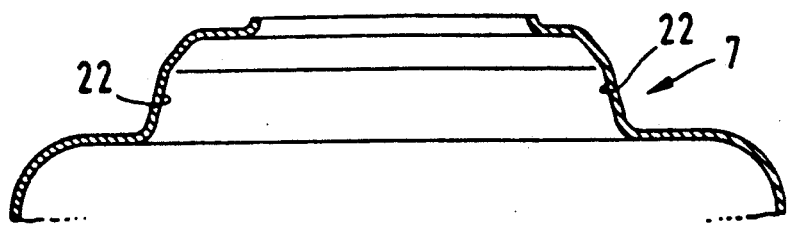
FIG. 4A shows a section through the mount receptacle along line C—C in FIG. 4.
Figure 4:
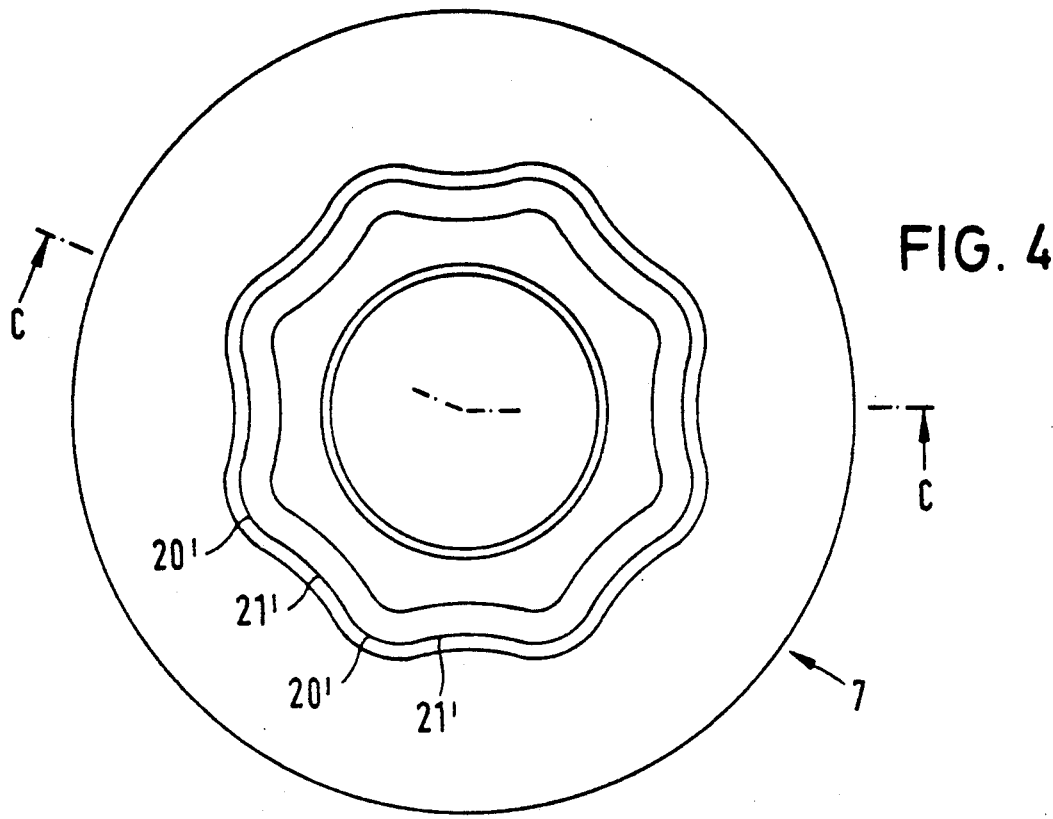
FIG. 4 shows a top view of the mount receptacle.
Figure 5:
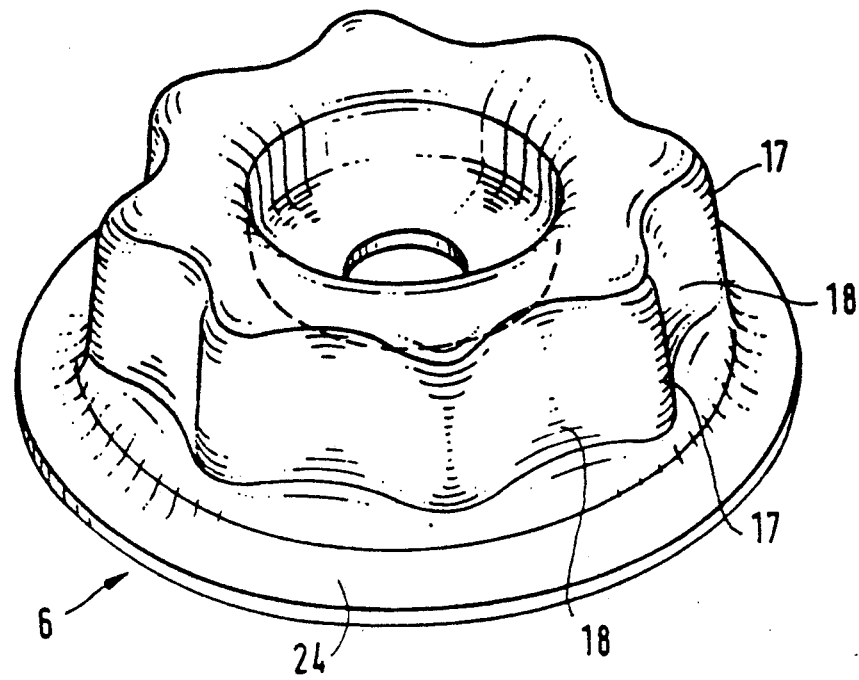
FIG. 5 shows a perspective illustration of the spacer.

The body-side mounting shown in FIG. 1 consists, in a known manner, of a helical spring 2 contacting the underside of a spring plate 1, with a shock absorber piston rod 3 passing through a recess in the spring plate 1 and with a spacer 6 contacting an axial roller bearing 5 mounted in the shock absorber piston rod 3, the spacer being placed adjacent to a body-side mount receptacle 7 and an annular rubber mount 8 being inserted between parts 6 and 7. The spacer 6 is immovably bolted, by means of a locked mounting nut 9, to the shock absorber piston rod 3 in the region of the free end thereof, with the free end of the shock absorber piston rod 3 passing through a recess 10 in the mount receptacle 7; on this is placed a plate 11 functioning as a spring deflection stop, which is secured by means of an additional nut 12 threaded onto the free end of the shock absorber piston rod 3 and engages behind the mount receptacle 7. The inner, peripheral rim 13 of the mount receptacle is oriented in the direction of the radially extending outer rim of the plate 11 and accommodates a stop ring 14 made of rubber.

The inventive configuration of the body-side mounting in the region of the spacer 6, rubber mount 8 and mount receptacle 7 will be described in general below with reference to the FIGS. It is evident from the FIGS. that the spacer 6, in the region of its outer circumferential surface 15 extending perpendicular to the inward deflection direction X or outward spring deflection direction Y of the suspension strut, which is in contact with the inner circumferential surface 16 of the rubber mount 8, has wavy projections 17 and depressions 18, which extend regularly over the outer periphery of the spacer 6. Correspondingly, the rubber mount 8 has, in the region of the inner circumferential surface 16, projections 18′ identical in shape and dimension to the depressions 18 of the spacer 6. The same applies to depressions 17′ in rubber mount 8, which interact with the projections 17 in the spacer 6. The same applies, furthermore, to the form-fitting connection between the rubber mount 8 and the mount receptacle 7: the rubber mount 8 in turn has, in the region of its outer circumferential surface 19 extending essentially parallel to the inward and outward spring deflection directions X, Y, wavy projections 20 and depressions 21 extending regularly over this region of the mount receptacle 7, which interact with depressions 20′ and projections 21′ of corresponding shape and dimension in the mount receptacle 7, extending over the inner circumferential surface 22 of the mount receptacle 7.

The wavy configuration of spacer 6, mount receptacle 7 and rubber mount 8 in the region of their essentially radial contact surfaces guarantees that the rubber mount 8 inserted between the spacer 6 and the mount receptacle 7 cannot creep when radial forces are introduced, since it is prevented from doing so by the teeth of the aforesaid parts. In the case of a usual load on the suspension strut mount in the inward spring deflection direction, force is transferred between the spacer 6 and the mount receptacle 7 essentially between the largely radially oriented outer annular extension 24 of the spacer 6 and the inner annular extension 25 of the mount receptacle 7, extending radially inward.

Although the present invention has been described with reference to preferred embodiments, persons skilled in the art will recognize that changes may be made in form and detail without departing from the spirit and scope of the invention.

The embodiments of the invention in which an exclusive property or privilege is claimed are defined as follows:

1. A body side mounting assembly for a suspension strut or spring shock absorber of a motor vehicle, the assembly including a rubber mount operatively mounted between a vehicular body and the suspension strut, predominantly loaded in shear, which is placed between a mount receptacle formed into the body or parts thereof and a spacer joined to the suspension strut, with the mount receptacle and spacer being constructed complementary to the rubber mount and receiving the latter in an inward spring deflection direction and radially thereto, characterized in that teeth are provided on an inner circumferential surface of the mount receptacle and on an outer circumferential surface of the spacer which engage respective complementary teeth in outer and inner circumferential surfaces of the rubber mount.

2. The body side mounting assembly according to claim 1, characterized in that the mount receptacle and the spacer are formed as stamped sheet-metal parts, wherein the teeth of these parts are formed as depressions and projections in the particular stamped sheet-metal part.

3. The body side mounting assembly according to claim 2, characterized by alternating wavy projections and depressions which extend regularly over the inner circumferential surface of the mount receptacle and the outer circumferential surface of the spacer.

4. A mounting assembly for a suspension damper, the mounting assembly comprising:
 (a) an annular spacer centrally mounted on the suspension damper, the spacer including an outer circumferential surface having a pattern of alternating projections and depressions; and
 (b) an annular rubber mount having
  (i) an inner circumferential surface pattern of alternating projections and depressions complementary to and received in the outer circumferential surface pattern of the spacer, and
  (ii) an outer circumferential surface having a pattern of alternating projections and depressions; and
 (c) an annular body-side mount receptacle having an inner circumferential surface pattern of alternating projections and depressions complementary to and received in the outer pattern of the rubber mount.

5. The mounting assembly as specified in claim 4 wherein the complementary patterns on the spacer, mount receptacle and rubber mount are formed as alternating wavy projections and depressions.

6. The mounting assembly as specified in claim 4 wherein the spacer and the mount receptacle each extend generally perpendicular to an axis of the damper, and wherein the spacer moves toward the mount receptacle as the mount is compressed during axial movement of the damper.

7. A mounting assembly for a suspension damper having a reciprocating piston rod, the mounting assembly comprising:
   (a) an annular spacer secured to the piston rod;
   (b) an annular elastromeric mount positioned adjacent the spacer;
   (c) first form fitting means for joining outer circumferential surface of the spacer with an inner circumferential surface of the mount;
   (d) an annular mount receptacle positioned adjacent the mount opposite the spacer; and
   (e) second form-fitting means for joining an outer circumferential surface of the mount with an inner circumferential surface of the mount receptacle,
   wherein the first and second form-fitting means are formed as alternating patterns of projections and depressions.

8. The mounting assembly as specified in claim 7, wherein the spacer and the mount receptacle each extend generally perpendicular to an axis and the damper, and wherein the spacer moves toward the mount receptacle as the mount is compressed during axial movement of the damper.

* * * * *